United States Patent
Story et al.

(10) Patent No.: US 6,658,502 B1
(45) Date of Patent: Dec. 2, 2003

(54) MULTI-CHANNEL AND MULTI-MODAL DIRECT MEMORY ACCESS CONTROLLER FOR OPTIMIZING PERFORMANCE OF HOST BUS

(75) Inventors: Franklyn H. Story, Chandler, AZ (US); Subramanian S. Meiyappan, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 554 days.

(21) Appl. No.: 09/593,448

(22) Filed: Jun. 13, 2000

(51) Int. Cl.[7] .............................................. G06F 13/28
(52) U.S. Cl. .......................... 710/22; 710/33; 710/107; 711/105
(58) Field of Search ............................... 710/22, 20, 23, 710/24, 29, 36, 107, 1, 5, 27–28, 33, 128; 712/225; 711/105, 111

(56) References Cited

U.S. PATENT DOCUMENTS

| | | | |
|---|---|---|---|
| 4,523,310 A | * | 6/1985 | Brown et al. ................ 370/112 |
| 5,416,916 A | | 5/1995 | Bayle .......................... 395/425 |
| 5,764,934 A | * | 6/1998 | Fisch et al. .................. 710/129 |
| 5,805,927 A | | 9/1998 | Bowes et al. ................ 395/843 |
| 5,845,107 A | * | 12/1998 | Fisch et al. .................. 395/500 |
| 5,896,513 A | * | 4/1999 | Fisch et al. .................. 395/278 |
| 6,055,584 A | | 4/2000 | Bridges et al. ............... 710/27 |
| 6,202,106 B1 | * | 3/2001 | Baxter ......................... 710/22 |
| 6,219,724 B1 | * | 4/2001 | Kim et al. .................... 710/22 |
| 6,289,023 B1 | * | 9/2001 | Dowling et al. ............. 370/419 |

FOREIGN PATENT DOCUMENTS

EP   0 775 960 A2   5/1997   ........... G06F/13/36

\* cited by examiner

*Primary Examiner*—Jeffrey Gaffin
*Assistant Examiner*—RiJue Mai
(74) *Attorney, Agent, or Firm*—Peter Zawilski

(57) ABSTRACT

A novel and sophisticated direct memory access (DMA) controller that can operate in either "fly-by" mode, "dual-cycle" mode, or "flow-through" mode. The DMA controller of the present embodiment supports a parametrizable number of channels, each of the channels providing support for one of the prior-noted modes of operation. The DMA controller of the present embodiment serves as bus master on the host bus and has the ability to interface with all the devices on the system. The DMA controller of the present embodiment is also optimized for zero wait state sequential transfers on the host bus. Further, the DMA controller of the present embodiment also houses an internal arbiter with programmable priority to choose arbitrate between the different channels, should more than one master that interface to the DMA controller request access to the host bus. An advantage of the present invention is that, because bus master devices are be off-loaded from the host bus, system performance can be dramatically improved. Another advantage is that the present invention provides an easy means for adding more devices to the system.

15 Claims, 5 Drawing Sheets

MULTI-CHANNEL AND MULTI-MODAL DIRECT MEMORY ACCESS CONTROLLER FOR OPTIMIZING PERFORMANCE OF HOST BUS

FIELD OF THE INVENTION

The present invention pertains to the general technology field of embedded computer systems. More specifically, the present invention pertains to the field of bus architecture for embedded computer systems.

BACKGROUND OF THE INVENTION

A bus architecture of a computer system conveys much of the information and signals involved in the computer system's operation. Typically, a host bus is used for connecting a central processing unit (CPU) to a memory and another bus is used for connecting the CPU to other elements such as input/output units. When the computer system executes its programming, it is imperative that data and information flow as fast as possible in order to make the computer as responsive as possible to the user. In many hardware applications, such as, graphics adapters, full motion video adapters, small computer systems interface (SCSI) host bus adapters, and the like, it is imperative that large block data transfers be accomplished expeditiously. These applications are just some examples of subsystems which benefit substantially from a very fast bus transfer rate. In many computer system architectures of today, the majority of the above mentioned subsystems reside on the computer system's expansion bus.

The expansion bus is generally used as a method of adding functional components to the computer system. The functional components are physically coupled to the expansion bus, and use the expansion bus to communicate and exchange information. Dedicated bus-based designs (designs specifically conceived to operate from an expansion bus) typically embody the functional components. The PCI (Peripheral Component Interconnect) bus is an industry standardized, widely known, and widely supported example of an expansion bus architecture.

In embedded processor systems, however, some peripheral devices are not connected to expansion buses. Rather, some peripheral devices may need to be connected to the processor local bus itself due to performance constraints and other design factors. FIG. 1 shows a typical implementation of an embedded controller system 100. Embedded controller system 100 includes a microprocessor 110 that shares the host bus 120 with two other bus mastering devices 130a–130b and two other slave devices 140a–140b. Bus mastering device 130a also includes a custom interface 135 for interfacing to another device. Embedded controller system 100 further includes a bus arbiter 150 for arbitrating bus access requests.

One problem associated with the implementation as shown in FIG. 1 is that the bus mastering devices 130a–130b may significantly affect the load on the host bus 120. Increased loading on the host bus 120 implies that the capacitance on the bus 120 is higher. Thus, the timing ($\tau=1/RC$) of the host bus 120 may be affected. In other words, the more devices are added to the host bus 120, the slower the processor. In order to achieve higher performance, the number of loads on the host bus must be as minimal as possible. As a result, the throughput of the entire embedded processor system 100 is reduced. Thus, what is needed is a method and system for adding more devices on the host bus without affecting the throughput of the embedded processor system.

Another drawback associated with the embedded processor system 100 is that a large number of I/O pins may be required for the custom interface 135. For example, assuming that the host bus has a 32-bit address bus and provides access to 4 GB of addressable space. If the custom interface 135 needs to access all of this available memory, then the custom interface also has to provide 32-bit addresses, thus increasing the number of I/O pins required. As the number of I/O pins available on a chip is limited, there exists a need for a method and system for providing an interface to multiple off-chip devices without significantly increasing the number of I/Os.

Yet another drawback of the implementation of system 100 is that, while the host 120 bus is being utilized by one master (e.g., bus mastering device 130a), another master (e.g., bus mastering device 130b) requesting access to the bus 120 has to monitor the bus activity all the time. Sometimes, bus activity monitoring is needed even if the master does not require access to the bus at all. From a power management standpoint, the implementation of system 100 is not very effective. Consequently, what is needed is an interface that consumes very little power.

SUMMARY OF THE DISCLOSURE

Accordingly, the present invention provides a multi-modal and multi-channel direct memory access (DMA) controller that supports both fly-by mode and flow-through modes of operation. In one embodiment of the invention, the DMA controller is a bus mastering device that supports the following modes of operation: (1) fly-by mode, (2) flow through mode, and/or (3) dual cycle mode. In the present embodiment, the DMA controller operates in the "fly-by" mode for devices that require low access latency. The DMA controller operates in the "dual-cycle" mode for devices that have a relatively low performance in comparison to the host bus. The DMA controller operates in the "flow-through" mode for devices that have a high performance but do not require low access latency.

The DMA controller of the present embodiment supports a parametrizable number of channels, each of the channels providing support for one of the prior-noted modes of operation. The DMA controller of the present embodiment serves as bus master on the host bus and has the ability to interface with all the devices on the system. The DMA controller of the present embodiment is also optimized for zero wait state sequential transfers on the host bus. Further, the DMA controller of the present embodiment also houses an internal arbiter with programmable priority to arbitrate between the different channels, should more than one master that interface to the DMA controller request access to the host bus.

In one embodiment of the present invention, the DMA controller has address-generation logic which provides access to the entire addressable range of the host bus. What is necessary from the bus mastering device point of view is the ability to access the address registers, the terminal count registers and the data registers of the DMA controller. In the present embodiment, device firmware would be responsible for writing the appropriate host address range into the address and count registers. Using shared busses on the device side of the DMA controller and addressing only the DMA registers reduce the number of I/O (input/output) required in the chip.

Embodiments of the present invention include the above and further include a multi-modal direct memory access (DMA) controller that has a front-end interface for communicating control signals and data with a host bus of a data processing system; a first back-end interface for communicating first control signals with a first bus-mastering device, and a second back-end interface for communicating second control signals and data with a second bus-mastering device. In one embodiment, the first control signals are operable to cause the DMA controller to enter a fly-by mode whereby data are directly communicated between the first bus-mastering device and the host bus. The second control signals are operable to cause the DMA controller to enter a flow-through mode whereby data are communicated between the second bus-mastering device and the host bus via the DMA controller.

BRIEF DESCRIPTION OF THE DRAWINGS

The accompanying drawings, which are incorporated in and form a art of this specification, illustrate embodiments of the present invention and, together with the description, serve to explain the principles of the invention.

DETAILED DESCRIPTION OF THE PREFERRED EMBODIMENTS

In the following detailed description of the preferred embodiments, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

The present invention provides a novel and sophisticated direct memory access (DMA) controller that can operate in either "fly-by" mode, "dual-cycle" mode, or "flow-through" mode. The DMA controller of the present embodiment supports a parametrizable number of channels, each of the channels providing support for one of the prior-noted modes of operation. The DMA controller of the present embodiment serves as bus master on the host bus and has the ability to interface with all the devices on the system. One advantage of the present invention is that bus mastering devices can be connected to the back-end of the multi-channel DMA controller, thus effectively decreasing the loading on the host bus. When the loading on the host bus is decreased, the host bus can be run at much higher speeds. Hence, a significant increase in system throughput can be achieved. Off-loading most bus mastering devices from the host bus can also result in a significant saving in power consumption. Another advantage of the present invention is that, by reducing the number of loads on the host bus, timing analysis and layout can be performed more easily. Further, the DMA controller can be configured to support devices within a wide range of performance requirements. Another advantage is that the present invention provides an easy means for adding more devices to the system. These and other advantages of the present invention will become more apparent in the discussions present below.

Figure 1:
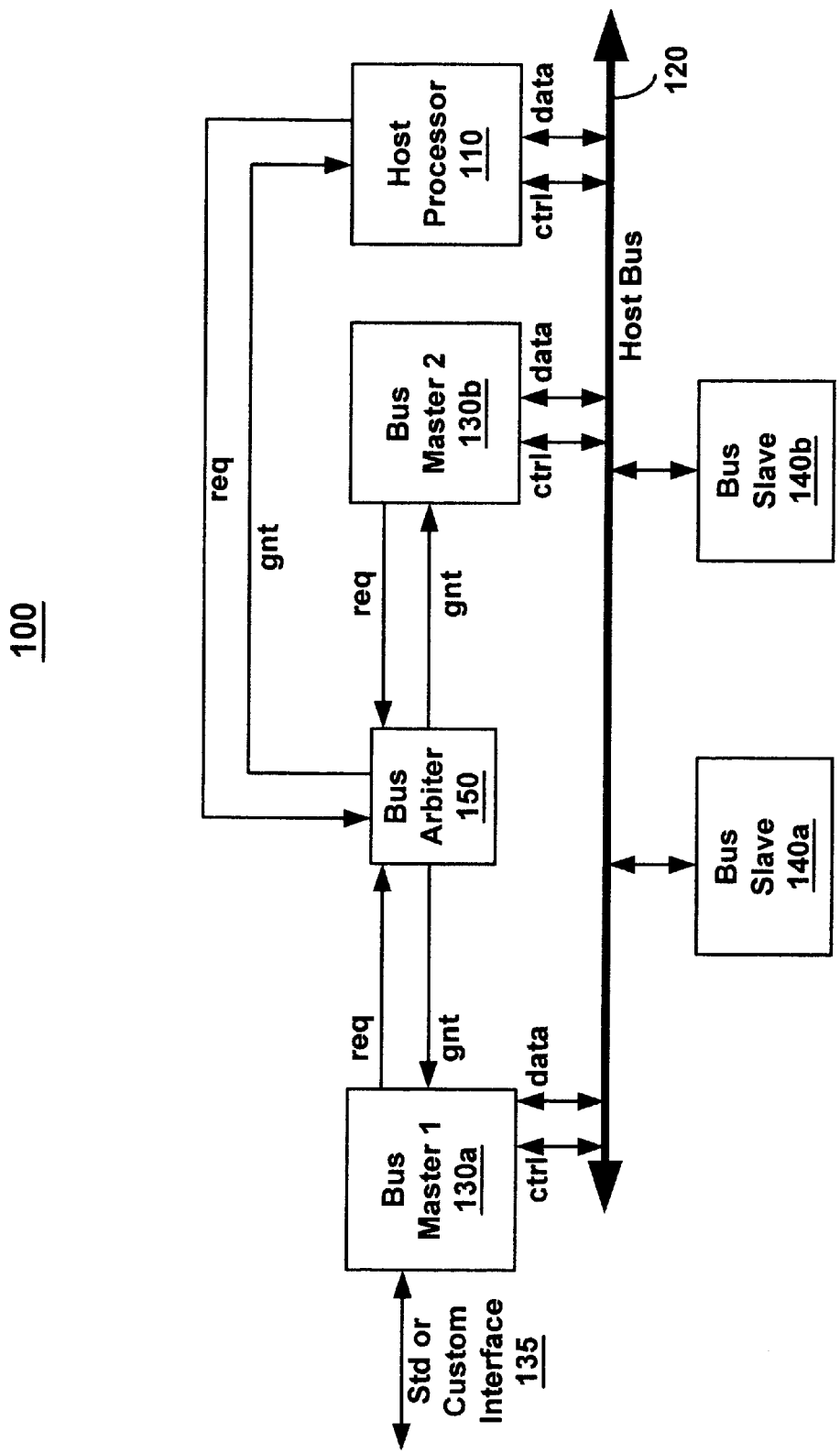
FIG. 1 illustrates a typical implementation of an embedded processor system.
Figure 2:
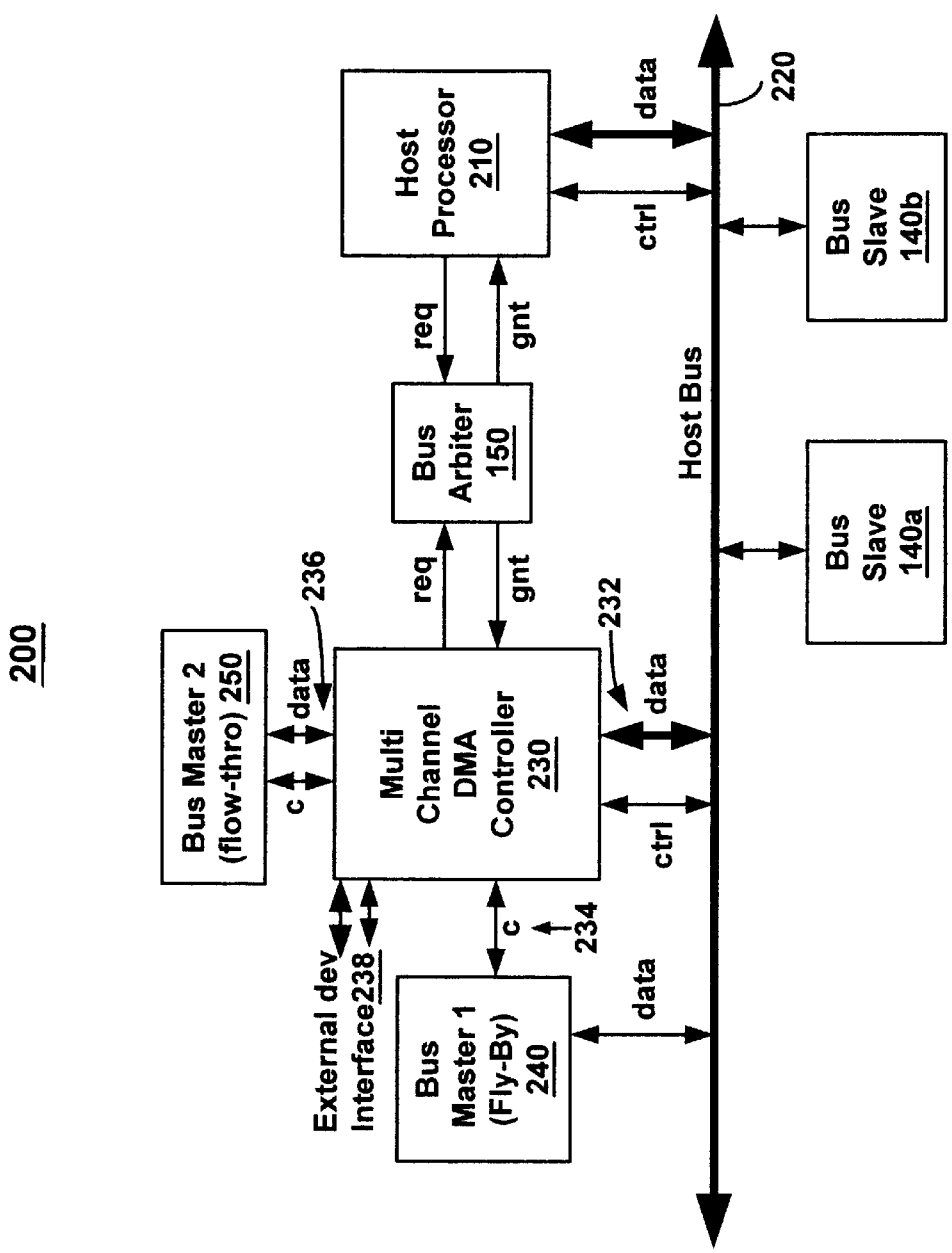
FIG. 2 illustrates an exemplary implementation of an embedded controller system having a multi-modal and multi-channel direct memory access (DMA) controller in accordance with an embodiment of the present invention.

An exemplary embedded system utilizing a multi-channel multi-modal DMA controller in accordance with the present invention is illustrated in FIG. 2. As illustrated, embedded controller system 200 includes a microprocessor 210 that shares the host bus 220 with a multi-channel multi-modal direct memory access (DMA) controller 230 and two slave devices 140a–140b (e.g., random access memory "RAM" units or read-only memory "ROM" units). Multi-channel multi-modal DMA controller 230 is coupled to the host bus 220 via a front-end interface 232. Embedded controller system 200 also includes a bus arbiter 150, a "fly-by" bus mastering device 240 and a "flow-through" bus mastering device 250. In one embodiment, DMA controller 230 may also include a back-end interface 238 for interfacing to an external device.

It should be noted that, in the present embodiment, "fly-by" bus mastering device 240 is coupled to the host bus 220 directly for communicating data. Control signals of the "fly-by" bus mastering device 240, however, are not communicated directly to the host bus 220. Rather, control signals of the "fly-by" bus mastering device 240 are communicated to a back-end interface 234 interface of DMA controller 230. "Flow-through" bus mastering device 250 is coupled to the host bus 220 indirectly via the DMA controller 230 through another back-end interface 236.

According to the present embodiment, DMA controller 230 is a bus mastering device that supports the following modes of operation: (1) fly-by; (2) flow-through; and (3) dual-cycle mode.

Fly By Mode

Figure 3:
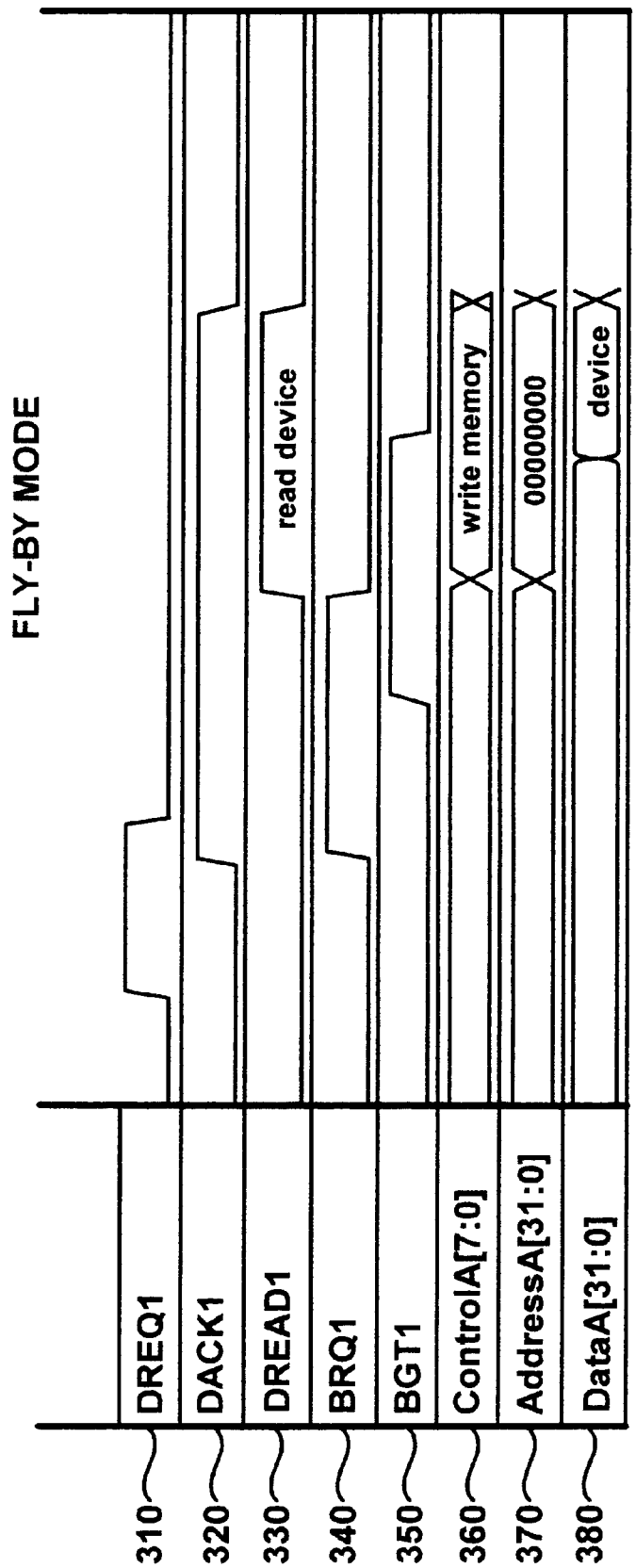
FIG. 3 illustrates an exemplary timing diagram for the embedded controller system of FIG. 2 operating in a fly-by mode in accordance with one embodiment of the present invention.

The fly-by operation mode of the present invention is suitable for devices that are not able to tolerate any access latency on the host bus. FIG. 3 is a timing diagram 300 illustrating an exemplary fly-by mode of operation of the embedded controller system 200. In fly by mode, the "fly-by" bus mastering device 240 programs the start address and terminal count in the registers (not shown) of the DMA controller 230, and asserts a DREQI signal 310. DMA controller 230 then acknowledges the request by asserting a DACK1 signal 320, and also asserts the BRQ1 signal 340 to the bus arbiter 150. As soon as the DMA controller 230 acquires the host bus 220 (BGT1 signal 350 is asserted by bus arbiter 150), the DMA controller 230 asserts valid device control signals 234. As soon as the "fly-by" bus mastering device 240 receives the valid device control signals 234, it may start driving the data (write cycle) or sampling the data (read cycle) directly on the host bus 220.

In the timing diagram 300, a memory write operation is performed. That is, as soon as the BGT1 signal 350 is asserted, DMA controller 230 establishes a DMA channel directly between the "fly-by" bus mastering device 240 and the memory by communicating a DREAD1 signal 330 to the "fly-by" bus mastering device 240, and by communicating bus control signals 360 ("ControlA") and address signals 370 ("AddressA") to the host bus 220. Then, data signals 380 ("DataA") are communicated from the bus mastering device 240 to the host bus 220.

Although, in fly-by mode of operation, the bus mastering device 240 still acts as a load on the host bus 220, the loading effect is only on less critical signals, namely the data bus. All other controls are handled by the DMA controller 230. Because of the latency-intolerance of such devices, no wait states are inserted on the bus 220. Hence, most of the signals are driven combinatorially from the host bus 220. Further, according to one embodiment of the present invention, the fly-by mode of operation is recommended only for devices that have significant performance requirement, since the fly-by mode of operation causes an added load on the data bus.

Flow Through Mode

Figure 4:
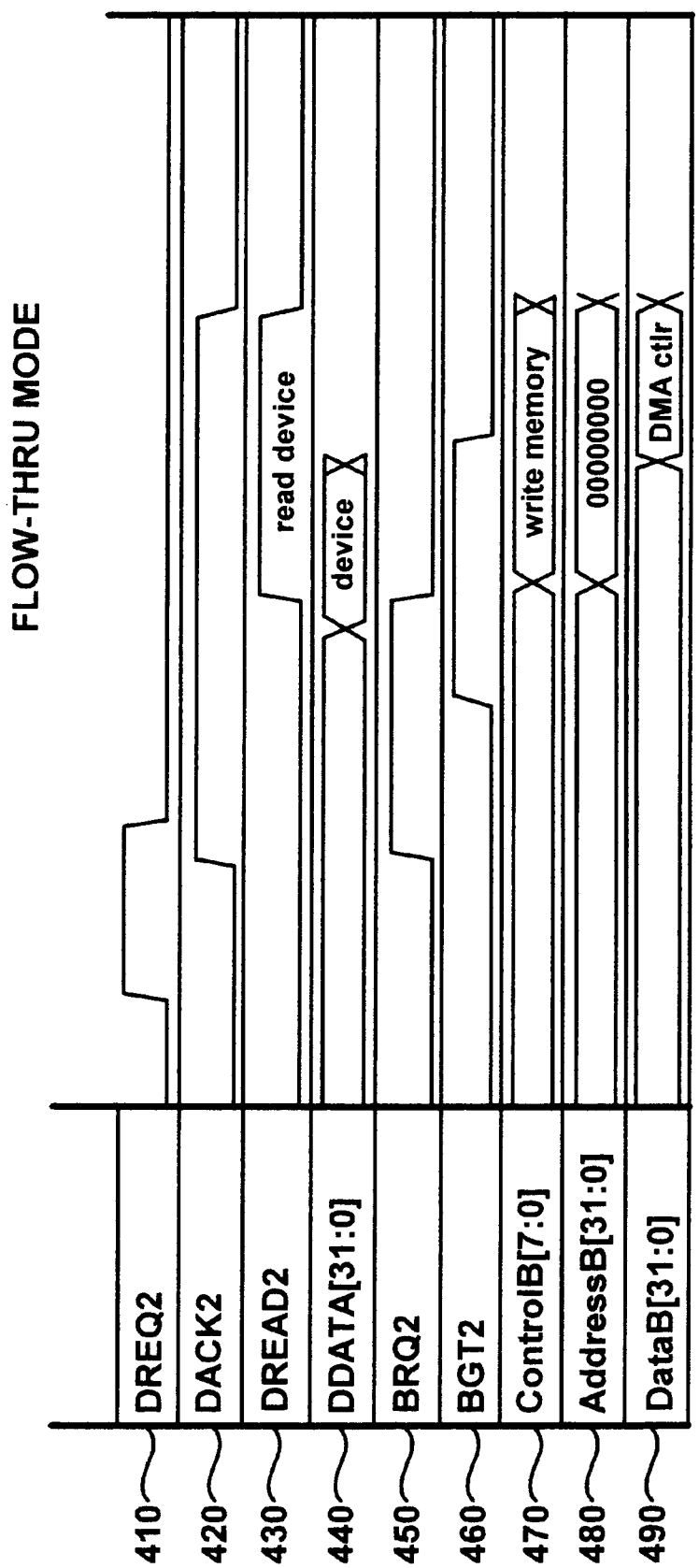
FIG. 4 illustrates an exemplary timing diagram for the embedded controller system of FIG. 2 operating in a flow-through mode in accordance with one embodiment of the present invention.

Typically, devices that can tolerate a minimal access latency can use the flow through mode. FIG. 4 is a timing diagram 400 illustrating an exemplary flow-through mode of operation of the embedded system 200 in accordance with the present invention. As illustrated, "flow-through" bus mastering device 250 asserts a signal DREQ2 410 to the DMA controller 230. Then, DMA controller 230 asserts a DACK2 signal 420 to acknowledge the request, and asserts a DREAD2 signal 430 to transfer the data (via data signals 440 "DDATA") from the device 250 into the DMA controller 230 to be stored within its FIFOs (not shown). As soon as a portion of the FIFO within DMA controller 230 is filled to some threshold level, the DMA controller 230 then asserts a BRQ2 450 signal to request control of the host bus 220. After the acquisition of the bus (BGT2 signal 460 asserted by arbiter), the DMA controller 230 communicates bus control signals 470 ("ControlB") and address signals 480 ("AddressB") to the host bus 220. Then, data signals 490 ("DataB") are communicated from the DMA controller 230 to the host bus 220. As an example, if the host bus 220 is idling, and if the DMA controller 230 and bus mastering device 250 are synchronous, the latency involved is only 1 clock cycle. It should be noted that, in the example illustrated in FIG. 4, a FIFO threshold of one is implemented. The exemplary implementation as shown in FIG. 4 also attempts to reduce the flow-thru latency by anticipating the availability of the data from the device, and by requesting the host system bus simultaneously with acknowledging the device.

Dual Cycle Mode

Certain devices, such as USB ("Universal Serial Bus") devices, do not require high throughput requirements, but, nonetheless, require bus mastering capability to transfer data. Such devices can be off loaded from the host bus by using the dual cycle mode of the present invention. Such devices do not need to be a bus master on the host bus. Instead, the devices can reside on a non-bus mastering peripheral-only bus (other than the host bus) that is accessible by the host processor.

Figure 5:
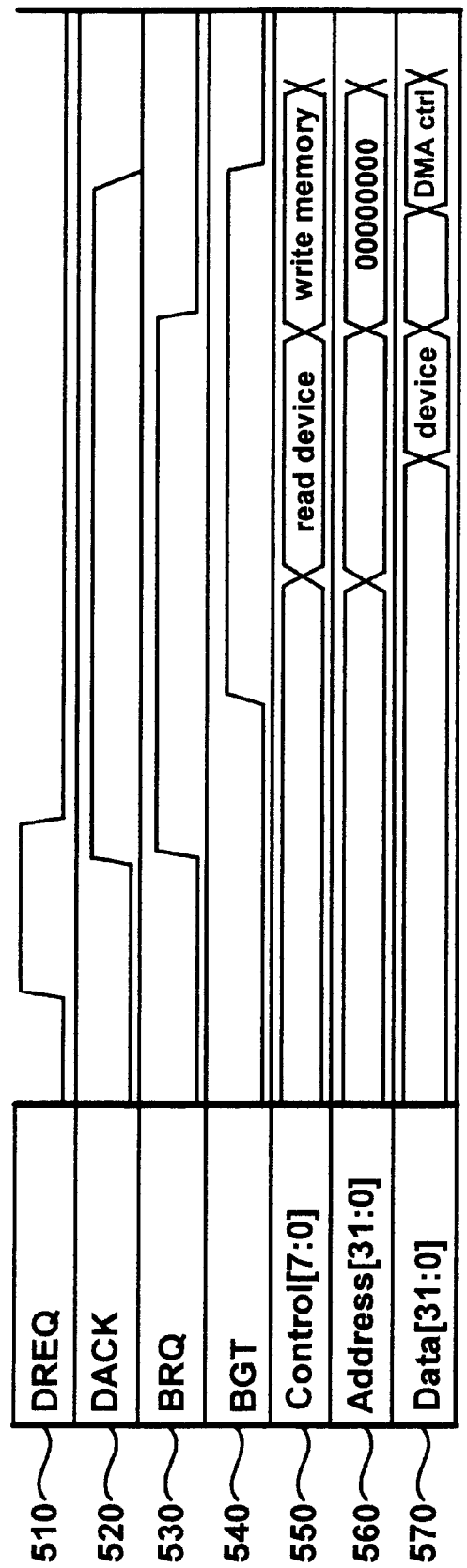
FIG. 5 illustrates an exemplary timing diagram for the embedded controller system of FIG. 2 operating in a dual-cycle mode in accordance with one embodiment of the present invention.

FIG. 5 is a timing diagram 500 illustrating an exemplary dual-cycle operation mode for embedded system 200 in accordance with the present invention. As illustrated, the host processor 210 establishes a DMA channel by programming a start address and a terminal count in the registers of the DMA controller 230. After the DMA channel is set up, the device requests a transfer by asserting DREQ 510. The DMA controller 230 then acknowledges the request by asserting DACK 520, and requests control of the host bus 220 by asserting the BRQ signal 530. When the request is granted (bus arbiter 150 asserting the BGT signal 540), the DMA controller 230 reads data 570 from the non-bus mastering device by communicating appropriate control signals 550 ("Control") and address signals 560 ("Address") to the host bus 230. The DMA controller then writes the data 570 to the memory by communicating appropriate control signals 550 and address signals 560 to the host bus 220. After the data is transferred, DMA controller 230 de-asserts DACK 520 indicating that the transfer is complete. The DMA controller 230 may also read data from the memory and transfer it to the non-bus mastering device using the same mechanisms.

Using this "scatter-gather" approach described above, multiple devices can also be polled at the same time. This off loads the processor of doing any elaborate and long data transfers, and also off loads the host bus of a bus mastering device.

Additional Advantages of the Multi-modal DMA Controller

According to one embodiment of the present invention, the DMA controller supports a parametrizable number of channels, each of the channels providing support for either/or mode of operation. The DMA controller of the present embodiment serves as bus master on the host bus and has the ability to interface with all the devices on the system. The DMA controller may also be optimized for zero wait state sequential transfers on the host bus. The DMA controller may also house an internal arbiter with programmable priority to choose arbitrate between the different channels, should more than one master that interface to the DMA controller request access to the host bus.

Additionally, in one embodiment of the present invention, the DMA controller has address-generation logic which provides access to the entire addressable range of the host bus. What is necessary from the bus mastering device point of view is the ability to access the address registers, the terminal count registers and the data registers of the DMA controller. For example, for a 32-bit data bus and an internal FIFO that is 10-word deep, only 4 address pins will suffice to address any location in the 4 GB space. Device firmware would then be responsible for writing the appropriate host address range into the address and count registers. This technique can be particularly useful when the bus mastering interface is an external interface, such as external interface 238 of FIG. 2.

Yet another advantage of the present invention is lower power consumption. If all the bus mastering devices are on the host bus itself, most protocols that support bus mastering require that the bus masters monitor the bus. For example, if there are no bus agents requesting the bus, the arbiter can park the bus on a default bus master. In such cases, the "parked" master will have to drive the bus. But this may fail if the bus mastering devices are shutdown in order to save power, or some other means have to be implemented to "wake up" the bus master before being parked.

However, according to one embodiment of the present invention, if the DMA controller host interface was asynchronous to all of the channels, then any device connected to a channel can be turned off at any time of operation, without having to worry about being parked on the host bus. The DMA controller will drive the necessary signals when the bus is parked on the DMA controller. Additionally, off-loading most bus mastering devices from the host bus can result in a significant power savings due to reduced capacitive loading on the host bus.

The present invention, a multi-channel multi-modal DMA controller for optimizing the performance of a host bus, has thus been disclosed. The present invention decreases the loading on the host bus, and thus the host bus can be run at much higher speeds. As a result, a significant increase in throughput can be achieved. Additionally, using shared buses on the DMA side and addressing only the DMA registers reduces the number of I/Os required in the chip.

Significant cost savings can also be achieved when the number if I/Os required is reduced. Furthermore, reducing the number of loads on the host bus makes timing analysis and layout much easier. It should be appreciated that, while the present invention has been described in particular embodiments, the present invention should not be construed as limited by such embodiments, but rather construed according to the below

What is claimed is:

1. A data processing system comprising:
    a host processor;
    a host bus coupled to said processor;
    a memory unit coupled to said host bus;
    a multi-modal direct memory access (DMA) controller coupled to said host bus wherein said DMA controller has bus-mastering capability and is operable in one of a fly-by mode, a flow-through mode and a dual-cycle mode; and
    a first bus-mastering device coupled to said host bus and said DMA controller, wherein said first bus-mastering device communicates first control signals to said DMA controller to cause said DMA controller to enter said fly-by mode and wherein said first bus-mastering device communicates data directly to said host bus when said DMA controller operates in said fly-by mode.

2. A data processing system as recited in claim 1 further comprising a second bus-mastering device coupled to said DMA controller, wherein said second bus-mastering device communicates second bus-control signals to said DMA controller to cause said DMA controller to enter said flow-through mode and wherein said second bus-mastering device communicates data to said host bus via said DMA controller when said DMA controller operates in said flow-through mode.

3. A data processing system as recited in claim 1 wherein said DMA controller supports a plurality of DMA channels.

4. A data processing system as recited in claim 3 wherein said DMA controller comprises an internal arbiter with programmable priority and configured for arbitrating between one of said plurality of DMA channels.

5. A data processing system as recited in claim 1 wherein said DMA controller is configured for zero wait state sequential transfers on said host bus.

6. A data processing system as recited in claim 1 wherein said DMA controller comprises address-generation logic that accesses an entire addressable range of said host bus.

7. A data processing system as recited in claim 1 wherein said DMA controller comprises an external interface for coupling to an external device.

8. A data processing system as recited in claim 1 further comprising a host bus arbiter that is coupled between said host processor and said DMA controller for arbitrating control of said host bus.

9. A data processing system comprising:
    a host processor;
    a host bus coupled to said processor;
    a memory unit coupled to said host bus;
    a multi-modal direct memory access (DMA) controller coupled to said host bus wherein said DMA controller has bus-mastering capability and is operable in one of a fly-by mode, a flow-through mode and a dual-cycle mode;
    a first bus-mastering device coupled to said host bus and said DMA controller, wherein said first bus-mastering device communicates first control signals to said DMA controller to cause said DMA controller to enter said fly-by mode and wherein said first bus-mastering device communicates data directly to said host bus when said DMA controller operates in said fly-by mode; and
    a second bus-mastering device coupled to said DMA controller, wherein said second bus-mastering device communicates second bus-control signals to said DMA controller to cause said DMA controller to enter said flow-through mode and wherein said second bus-mastering device communicates data to said host bus via said DMA controller when said DMA controller operates in said flow-through mode.

10. A data processing system as recited in claim 9 wherein said DMA controller is configured for communicating data between a non-bus-mastering device and said memory unit when said DMA controller operates in said dual-cycle mode.

11. A data processing system as recited in claim 9 wherein said DMA controller supports a plurality of DMA channels.

12. A data processing system as recited in claim 9 wherein said DMA controller is configured for zero wait state sequential transfers on said host bus.

13. A data processing system as recited in claim 9 wherein said DMA controller comprises address-generation logic that accesses an entire addressable range of said host bus.

14. A data processing system as recited in claim 9 wherein said DMA controller comprises an external interface for coupling to an external device.

15. A data processing system as recited in claim 9 further comprising a host bus arbiter that is coupled between said host processor and said DMA controller for arbitrating control of said host bus.

* * * * *